United States Patent [19]

Udagawa et al.

[11] Patent Number: 5,272,808
[45] Date of Patent: Dec. 28, 1993

[54] METHOD OF MANUFACTURING A CYLINDER HEAD GASKET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 771,987

[22] Filed: Oct. 7, 1991

[51] Int. Cl.⁵ .............................................. B23P 15/00
[52] U.S. Cl. ...................................... 29/888.3; 29/428
[58] Field of Search ................................ 29/888.3, 428; 277/235 B, 234, 236

[56] References Cited

U.S. PATENT DOCUMENTS

| | | | |
|---|---|---|---|
| 4,317,576 | 3/1982 | Barker et al. | 277/235 B |
| 4,620,710 | 11/1986 | Lambert et al. | 29/888.3 |
| 4,834,399 | 5/1989 | Udagawa et al. | 277/235 B |
| 4,938,488 | 7/1990 | Udagawa et al. | 277/235 B |
| 4,995,624 | 2/1991 | Udagawa et al. | 277/235 B |
| 5,022,661 | 6/1991 | Nakasone | 277/235 B |
| 5,054,795 | 10/1991 | Udagawa et al. | 277/235 B |
| 5,058,908 | 10/1991 | Udagawa | 277/235 B |
| 5,062,649 | 11/1991 | Udagawa | 277/235 B |
| 5,076,595 | 12/1991 | Udagawa | 277/235 B |
| 5,078,413 | 1/1992 | Miyaoh | 277/235 B |

Primary Examiner—Irene Cuda
Attorney, Agent, or Firm—Kanesaka and Takeuchi

[57] ABSTRACT

A cylinder head gasket prepared by a method of the invention is installed between a cylinder head and a cylinder block. In the method, a plate is prepared at first to have at least one hole smaller than a hole of the engine to be sealed. The first plate is bent around the first hole so that the first plate is provided with a curved portion defining a hole corresponding to the hole of the engine, a flange extending away from the curved portion, and a space around the curved portion. The curved portion is compressed to eliminate the space to thereby form a solid portion by the flange and an annular portion. A second plate having a hole larger than the flange is prepared and is assembled with the first plate. The second plate is located at a side opposite to the flange of the first plate. The second plate does not laminate the flange of the first plate.

2 Claims, 1 Drawing Sheet

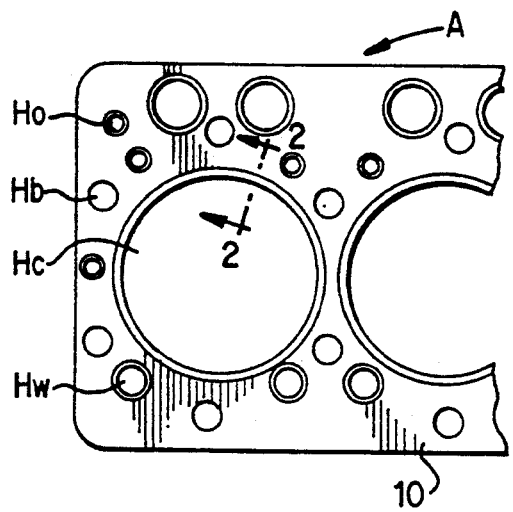
FIG. 1
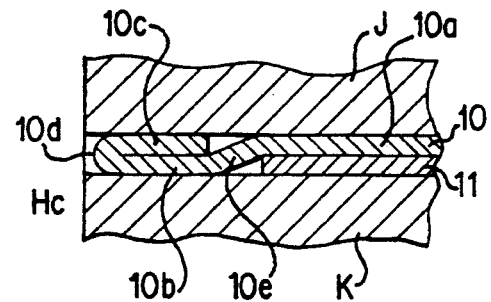
FIG. 2
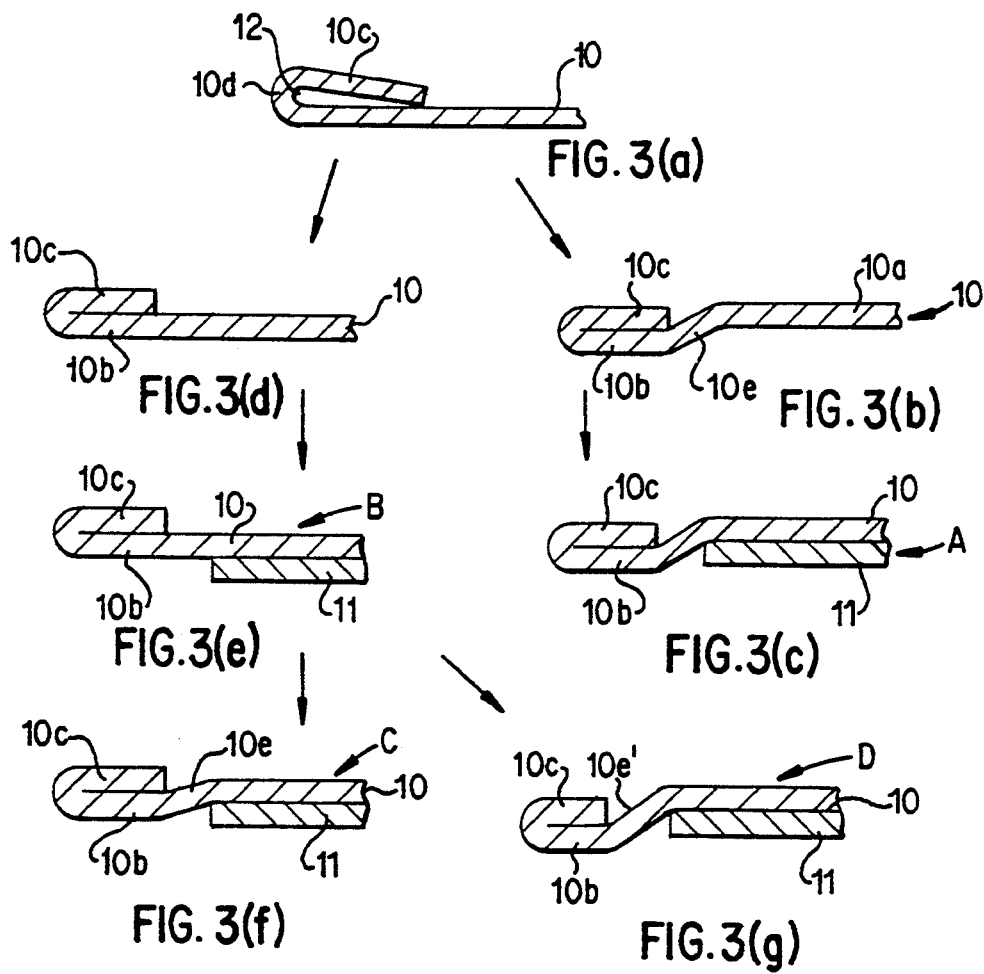

METHOD OF MANUFACTURING A CYLINDER HEAD GASKET

BACKGROUND OF THE INVENTION AND RELATED ART STATEMENT

The present invention relates to a method of manufacturing a cylinder head gasket formed of a plurality of metal plates.

In manufacturing a steel laminate gasket, metal plates for constituting the gasket are prepared separately to have holes for cylinder bores, water holes and so on. In case a curved portion and a flange are formed in a metal plate around a hole to be sealed, the flange and the curved portion are, at first, bent perpendicular to the plate, and then the flange is further bent to be located above a base portion of the metal plate.

In this case, when the flange is bent above the base portion of the metal plate, a space is generally formed between the flange and the base portion around the cured portion. The metal plate with the space around the curved portion may be assembled with other metal plates for constituting a steel laminate gasket.

Although the space provides resiliency at the curved portion, when the gasket is used for a while, the curved portion may gradually be flattened to thereby loose resiliency at the curved portion. Accordingly, the metal plate with the space around the curved portion may be further processed to be flattened over the base portion.

In case the plate with the flattened flange is to be prepared, after the flange is bent over the base portion, the flange is compressed further against the base portion. The plate with the flattened flange may be assembled with other plates to form a steel laminate gasket.

In the conventional metal gasket, the metal plate with the flattened flange or the metal plate with the space around the curved portion may be assembled with other metal plates. However, these plates are simply assembled with other metal plates, and are not processed further or assembled to have specific function.

Accordingly, one object of the invention is to provide a method of manufacturing a cylinder head gasket, wherein the steel laminate gasket can be efficiently assembled together.

Another object of the invention is to provide a method of manufacturing a cylinder head gasket as stated above, wherein the steel laminate gasket can be assembled to provide resiliency for sealing around a hole.

A further object of the invention is to provide a method of manufacturing a cylinder head gasket as stated above, wherein the steel laminate gasket can be easily and economically manufactured.

Further objects and advantages of the invention will be apparent from the following description of the invention.

SUMMARY OF THE INVENTION

In accordance with the present invention, a cylinder head gasket to be installed between a cylinder head and a cylinder block is manufactured.

At first, a first plate is prepared to have at least one hole smaller than a hole of the engine to be sealed and then, the first plate is bent around the first hole. As a result, the first plate is provided with a curved portion defining a hole substantially corresponding to the hole of the engine, and a flange extending away from the curved portion.

Also, the first plate includes an annular portion situated at a side opposite to the flange, and a base portion located outside the annular portion and extending substantially throughout an entire area of the engine. A space is formed around the curved portion between the flange and the annular portion.

The flange or the curved portion is then compressed so that the space between the flange and the annular portion is substantially eliminated. As a result, a solid portion is formed by the flange and the annular portion.

Then, a plate is prepared to have a second hole. The hole has a size larger than a size of the flange. Finally, the first and second plates are assembled so that the second plate is located at a side opposite to the flange of the first plate. The second plate does not laminate the flange of the first plate.

When the curved portion is compressed, a portion between the annular portion and the base portion may be bent so that the flange dents while the annular portion projects relative to the base portion. Namely, the flange and the annular portion are shifted toward the second plate.

On the other hand, the portion between the annular portion and the base portion may be bent when the gasket is installed between the cylinder head and the cylinder block and is tightened together. In this case, the flange and the annular portion have resiliency in the direction opposite to the tightening pressure to thereby improve sealing effect between the cylinder head and the cylinder block.

Alternatively, after the first and second plates are assembled, the first plate may be preset so that a portion between the annular portion and the base portion is at least partly bent.

In the present invention, the curved portion is substantially entirely compressed to eliminate the space. Therefore, creep relaxation at the curved portion is substantially prevented. In this respect, if there is a space at the curved portion, the curved portion may gradually be flattened to decrease surface pressure at the curved portion. As a result, fluid may leak around the curved portion.

BRIEF DESCRIPTION OF THE DRAWINGS

FIG. 1 is a partial plan view of a steel laminate gasket manufactured in accordance with the invention;

FIG. 2 is an enlarged section view taken along a line 2—2 in FIG. 1, wherein the gasket is compressed between a cylinder head and a cylinder block; and FIGS. 3(a) to FIG. 3(g) are explanatory section views for showing steps of manufacturing the steel laminate gasket of the invention.

DETAILED DESCRIPTION OF PREFERRED EMBODIMENTS

Referring to FIG. 1, a cylinder head gasket A prepared in accordance with the present invention is shown. The gasket A includes a plurality of cylinder bores Hc, water holes Hw, oil holes Ho, bolt holes Hb and so on, as in the conventional gasket. In the gasket A, areas around the cylinder bores Hc are prepared in accordance with the present invention. Other areas, such as those around the water holes Hw and oil holes Ho, may be prepared separately from or simultaneously with the method of the present invention. The other areas may also be prepared in accordance with the method of the invention.

FIG. 2 shows the gasket A installed between a cylinder head J and a cylinder block K. As shown in FIG. 2, the gasket A is formed of an upper plate 10, and a lower plate 11. The upper plate 10 includes a base portion 10a extending substantially throughout the entire area of the engine, an annular portion 10b and a flange 10c located above the annular portion 10b. A curved portion 10d is formed between the annular portion 10b and the flange 10c to define the cylinder bore Hc. Also, an inclined portion 10e is formed between the base portion 10a and the annular portion 10b.

The lower plate 11 includes a large hole around the cylinder bore Hc. When the upper and lower plates 10, 11 are assembled, the lower plate 11 does not laminate the annular portion 10b nor the flange 10c, and is disposed under the base portion 10a.

In the gasket A, when the thickness of the lower plate 11 is changed, surface pressure around the cylinder bore Hc is changed. Namely, in case the thickness of the lower plate 11 is thicker than that of the upper plate 10, surface pressure around the cylinder bore Hc becomes weak, but in case the thickness of the lower plate 11 is thinner than that of the upper plate 10, surface pressure around the cylinder bore Hc becomes strong. The thickness of the lower plate 11 is selected based on the requirement of the engine.

When the gasket A is prepared, at first, the upper plate 10 is cut to have a proper outer configuration, as partly shown in FIG. 1. Also, the holes for the cylinder bores Hc, water holes Hw, oil holes Ho and so on are formed in the upper plate 10. At this time, since the flange 10c is formed around the cylinder bore Hc, the holes for the cylinder bore Hc are made small to include the curved portion 10d and the flange 10c.

The lower plate 11 is also prepared to have a proper outer configuration and the hole larger than the flange.

The upper plate 10 thus prepared is bent so that the flange 10c and the curved portion 10d orient perpendicular to the base portion 10a. Then, the flange 10c is further bent, as shown in FIG. 3(a). At this time, a space 12 is formed around the curved portion 10d.

In a first method of the invention, as shown in FIG. 3(b), the upper plate 10 is compressed so that the space 12 is eliminated, and the inclined portion 10e is formed between the base portion 10a and the annular portion 10b. An emboss or solid portion is formed by the flange 10c and the annular portion 10b. Thereafter, the second plate 11 is assembled with the first plate 10. The upper and lower plates 10, 11 may be connected together by spot welding.

When assembled, the upper surface of the flange 10c is substantially flush with the upper surface of the base portion 10a, while the lower surface of the annular portion 10b is substantially flush with the lower surface of the lower plate 11.

In the first method, the inclined portion 10e is bent or formed at the same time of compressing the flange 10c. Therefore, the gasket A is completed by assembling the upper plate 10 and the lower plate 11. When the gasket A is installed in the engine and is compressed, the form of the gasket A does not substantially change to seal around the cylinder bore Hc.

In the second method, the plate 10 as shown in FIG. 3(a) is bent so that the flange 10c is flattened relative to the annular portion 10b, as shown in FIG. 3(d), and then the lower plate 11 is situated under the base portion 10a of the upper plate 10. The upper and lower plates 10, 11 may be connected together by spot welding.

The gasket as shown in FIG. 3(e) may be a final product B. In this case, the gasket B is installed between the cylinder head J and the cylinder block K and is tightened, by which the flange 10c and the annular portion 10b are bent to form the inclined portion 10e. In the gasket B, the inclined portion 10e has resiliency, so that the gasket B provides sealing pressure by resiliency of the inclined portion 10c in addition to tightening pressure applied thereon.

The gasket B as shown in FIG. 3(e) may be further processed for presetting, by which a gasket C is finished to have a predetermined thickness. In the gasket C, the inclined portion 10e is slightly formed. When the gasket C is tightened between the cylinder head J and the cylinder block K, the inclined portion 10e is further bent.

In the gaskets B and C, when the gaskets are installed between the cylinder head and the cylinder block and are tightened, the gaskets B, C have changed to have the shapes as in the gasket A. The gaskets B and C operate similar to the gasket A.

The gasket B as shown in FIG. 3(e) may be further processed so that an inclined portion 10e' has a height greater than the total thickness of the flange 10c and the annular portion 10b. When a gasket D as shown in FIG. 3(g) is compressed between the cylinder head J and the cylinder block K, the inclined portion 10e' is compressed to provide resiliency, which also seals around the cylinder bore Hc. The gasket D operates as in the gasket B.

In the gaskets formed in accordance with the present invention, there is no space around the curved portion. Therefore, creep relaxation at the curved portion is prevented. Especially, when the cylinder head is made of an aluminum alloy, portions away from bolts may not be strongly tightened. Since the gasket does not have space around the curved portion, creep relaxation does not occur at those portions, and the gasket can seal securely around the portions away from the bolts.

In the method of the invention, the gasket without the space around the curved portion is easily formed.

While the invention has been explained with reference to the specific embodiments of the invention, the explanation is illustrative and the invention is limited only by the appended claims.

What is claimed is:

1. A method of manufacturing a cylinder head gasket and installing the gasket in an engine, said engine having at least one hole to be sealed and including a cylinder head and a cylinder block, said gasket being formed of a first plate and a second plate situated under the first plate, said first plate having a base portion extending substantially throughout an entire area of the engine, a curved portion for defining a first hole corresponding to the hole of the engine, an annular portion extending from the curved portion around the first hole, an inclined portion situated between the base portion and the annular portion, and a flange extending away from the curved portion and situated above the annular portion, said second plate having a second hole larger than the first hole so that the second plate does not laminate the annular portion, said method comprising, preparing the first plate having at least one hole smaller than the hole of the engine, bending the first plate around said at least one hole so that the first plate is provided with the curved portion defining the first hole, the flange located above the annular portion, and a space around the curved portion between the flange and the annular portion, compressing the curved portion to substantially eliminate the space around the curved portion to thereby form a solid portion by the flange and the annular portion, assembling the first and second plates so that the second plate is located at a side opposite to the flange of the first plate and the second plate does not laminate the flange of the first plate, and installing the gasket between the cylinder head and the cylinder block and tightening together for bending a portion between the annular portion and the base portion to form the inclined portion so that the flange and the annular portion receive force in a direction opposite to a tightening pressure to thereby provide sealing effect between the cylinder head and the cylinder block.

2. A method according to claim 1, wherein said gasket consists of the first and second plates.

* * * * *